United States Patent Office 2,773,065
Patented Dec. 4, 1956

2,773,065

CYCLOALKANONECARBOXYLIC ACID ISONICOTINYLHYDRAZONES AND THEIR SALTS

Gino Carrara, Milan, Italy, assignor to Lepetit S. p. A., Milan, Italy

No Drawing. Application October 13, 1953, Serial No. 385,886

Claims priority, application Italy October 23, 1952

3 Claims. (Cl. 260—295)

The present invention relates to the manufacture of cycloalkanonecarboxylic acid isonicotinylhydrazones and their alkali and alkaline earth metal salts.

The compounds with which the invention is concerned may be represented by the following general formula:

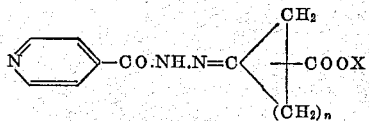

wherein X represents hydrogen or a non-toxic alkali or alkaline earth metal, like sodium, potassium and calcium, while $n$ is 3 or 4.

The compounds of the above formula have outstanding anti-tubercular properties and low toxicity, and are administered in the same manner and in dosages of the same order as the known isonicotinyl acid hydrazide compounds.

The compounds of the above general formula can be easily prepared according to the present invention, starting from isonicotinic acid hydrazide of the formula

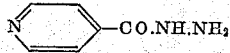

and from a salt of an alkali or alkaline earth metal with a cycloalkanonecarboxylic acid of the formula

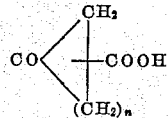

wherein $n$ has the same significance as indicated above. More particularly, to 1 mole of cycloalkanonecarboxylic acid dissolved in a solution of the equivalent amount of an alkali or alkaline earth metal hydroxide, 1 mole of hydrazide is added, and the resulting eventually filtered solution is evaporated to dryness, thus yielding the alkali or alkaline earth metal salt of cycloalkanonecarboxylic acid acylhydrazone.

The present invention is clearly illustrated by the following examples, which, nevertheless, are not intended as indicating the limits of the invention.

*Example*

To 28.4 g. of 2-cyclohexanonecarboxylic acid, suspended in 50 cc. of water, a solution of 8 g. of sodium hydroxide in 200 cc. of water is added, then it is filtered and to the so obtained solution 27.4 g. of isonicotinic acid hydrazide are added. It is allowed to stand for 10 minutes, then, under reduced pressure, the solution is evaporated to dryness and the residue is dried. 2-cyclohexanonecarboxylic acid isonicotinylhydrazone is obtained in the form of the sodium salt.

The free acid may be isolated by redissolving the salt in a little water and acidifying the solution with dilute hydrochloric acid. The product that so precipitates is collected in vacuo and dried.

What I claim is:

1. A compound of the formula

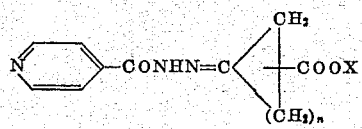

wherein X is a member of the group consisting of hydrogen and non-toxic alkali and alkaline earth metals, and $n$ is an integer from 3 to 4.

2. Cyclopentanone-3-carboxylic acid isonicotinylhydrazone of the formula

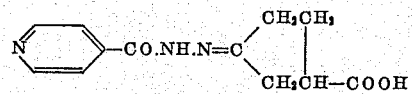

3. Cyclohexanone-2-carboxylic acid isonicotinylhydrazone of the formula

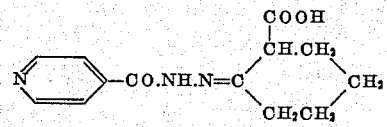

References Cited in the file of this patent

Shchukina et al.: Doklady Akademii Nauk Soyuza Sovetskikh Sotsialisticheskikh Respublic, vol. 84, pp. 981–4, abstracted in Chem. Abst., vol. 46, col. 10431(i) 1952.

Yale et al.: Jour. Am. Chem. Soc., vol. 75, pp. 1933–42, Sept. 19, 1952.